(12) United States Patent
Sommers

(10) Patent No.: US 11,193,591 B2
(45) Date of Patent: Dec. 7, 2021

(54) SEAL SACRIFICIAL WEAR INDICATOR

(71) Applicant: United Technologies Corporation, Farmington, CT (US)

(72) Inventor: Mark T. Sommers, Vernon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 493 days.

(21) Appl. No.: 15/667,974

(22) Filed: Aug. 3, 2017

(65) Prior Publication Data
US 2019/0040959 A1 Feb. 7, 2019

(51) Int. Cl.
| | |
|---|---|
| *F16J 15/34* | (2006.01) |
| *F01D 11/00* | (2006.01) |
| *F01D 21/00* | (2006.01) |
| *F16D 66/02* | (2006.01) |
| *F01D 21/10* | (2006.01) |
| *G01M 13/005* | (2019.01) |

(52) U.S. Cl.
CPC ......... *F16J 15/3492* (2013.01); *F01D 11/003* (2013.01); *F01D 21/003* (2013.01); *F01D 21/10* (2013.01); *F16D 66/02* (2013.01); *F05D 2220/32* (2013.01); *F05D 2260/80* (2013.01); *F05D 2300/11* (2013.01); *G01M 13/005* (2013.01)

(58) Field of Classification Search
CPC .... F16J 15/3268; F16J 15/166; F16J 15/3492; F01D 11/003; F01D 21/003; F01D 21/10; F16D 66/02; F05D 2260/80; G01M 13/005
See application file for complete search history.

(56) References Cited

U.S. PATENT DOCUMENTS

| | | | | |
|---|---|---|---|---|
| 2,937,039 | A * | 5/1960 | Santapa | F16J 15/348 277/422 |
| 3,632,117 | A * | 1/1972 | Villasor | F16J 15/3464 277/388 |
| 3,695,406 | A | 10/1972 | Graham et al. | |
| 4,036,505 | A * | 7/1977 | Floyd | F16J 15/3496 277/405 |
| 4,174,844 | A * | 11/1979 | Zobens | F16J 15/3404 277/390 |
| 4,424,973 | A | 1/1984 | Heilala | |
| 4,497,493 | A * | 2/1985 | Sall | F16J 15/3404 277/306 |
| 5,014,999 | A * | 5/1991 | Makhobey | F01D 11/003 277/422 |

(Continued)

FOREIGN PATENT DOCUMENTS

GB 2442490 4/2008

OTHER PUBLICATIONS

European Search Report for EP Application No. 18186900.9 dated Oct. 23, 2018.

*Primary Examiner* — Eugene G Byrd
(74) *Attorney, Agent, or Firm* — Getz Balich LLC

(57) ABSTRACT

Aspects of the disclosure are directed to a system comprising: a rotatable seal runner, a stationary sealing member that includes a base and a nose that extends from the base in an axial direction and interfaces with the seal runner, a carrier that supports the sealing member, and a tab coupled to the carrier, where the tab extends from the carrier in the axial direction towards the seal runner.

13 Claims, 7 Drawing Sheets

(56) References Cited

U.S. PATENT DOCUMENTS

| | | | |
|---|---|---|---|
| 5,017,022 A * | 5/1991 | Ruggles | F16C 17/03 384/100 |
| 6,142,476 A * | 11/2000 | Iwane | F16J 15/3464 277/358 |
| 6,322,081 B1 * | 11/2001 | Ullah | F16C 33/76 277/504 |
| 6,360,610 B1 * | 3/2002 | Jarzynski | G01N 29/11 73/32 A |
| 8,864,446 B2 | 10/2014 | Singh et al. | |
| 2009/0014245 A1 | 1/2009 | Shevchenko et al. | |
| 2009/0134584 A1 * | 5/2009 | Lederer | F16J 15/342 277/369 |
| 2009/0142180 A1 * | 6/2009 | Munson | F01D 11/001 415/111 |
| 2009/0152818 A1 * | 6/2009 | Droscher | F16J 15/3464 277/370 |
| 2010/0066027 A1 * | 3/2010 | Vasagar | F01D 11/003 277/350 |
| 2010/0106429 A1 * | 4/2010 | Horak | F16J 15/3492 702/34 |
| 2011/0175297 A1 * | 7/2011 | Fesl | F16J 15/3464 277/358 |
| 2012/0133099 A1 * | 5/2012 | Fesl | F16J 15/3464 277/358 |
| 2012/0267858 A1 | 10/2012 | Rust | |
| 2013/0285331 A1 * | 10/2013 | Kostka | F01D 11/003 277/411 |
| 2014/0265151 A1 * | 9/2014 | Vasagar | F01D 11/003 277/500 |
| 2015/0240951 A1 * | 8/2015 | Kirchner | F16J 15/3464 277/500 |
| 2016/0178064 A1 | 6/2016 | Vatovec et al. | |
| 2017/0234430 A1 * | 8/2017 | Fadgen | F16J 15/3464 277/500 |

\* cited by examiner

SEAL SACRIFICIAL WEAR INDICATOR

BACKGROUND

Gas turbine engines, such as those which power aircraft and industrial equipment, employ a compressor to compress air that is drawn into the engine and a turbine to capture energy associated with the combustion of a fuel-air mixture. An engine frequently includes one or more seals. Seals are used to isolate one or more regions of the engine. Seals help to ensure stable and efficient operation of the engine.

Referring to FIG. 2, a sealing system 200 is shown. The system 200 interfaces rotating structure 206 and static structure 212 in forming the seal. The rotating structure 206 is frequently referred to, or may include, a rotatable seal land/runner. As the details of the rotating structure 206 are known to one skilled in the art, a further description of the rotating structure 206 is omitted herein for the sake of brevity.

The static structure 212 includes a carrier 218 and a sealing member 224. The sealing member 224 is frequently implemented as one or more carbon segments. The carrier 218 supports the sealing member 224. The carrier 218 is typically made of a metal or metal alloy. The carrier 218 may include iron or nickel.

When installed on an engine, a nose 226 of the sealing member 224 extends (e.g., axially extends) from a base 228 of the sealing member 224 towards the rotating structure 206 such that the nose 226 interfaces to the rotating structure 206. The nose 226 wears during engine operation/use. For example, the nose 226 wears based on the nose 226 rubbing with/abutting the rotating structure 206.

In many instances, the engine may be scheduled for maintenance/inspection prior to the nose 226 being completely worn. For example, 50% of the material (e.g., 50% of a span) of the nose 226 may wear along, e.g., the superimposed axial direction between (scheduled) engine maintenance activities/procedures. A first instance of the sealing member 224 may be discarded of and a second instance of the sealing member 224 may be installed in place of the first instance of the sealing member 224 during such a procedure. However, in some instances the nose 226 may incur excessive wear, such that the nose 226 may be substantially completely worn prior to a next scheduled engine maintenance/inspection procedure.

When the nose 226 is (substantially) completely worn, the rotating structure 206 shares an interface 252 with the carrier 218 (see the system 200' of FIG. 2A). Portions of the carrier 218 at the interface 252 may begin to wear next due to the contact between the carrier 218 and the rotating structure 206. Those portions of the carrier 218 that wear and are liberated from the carrier 218 are collected by a collection/detection device 258. The detection device 258 provides an indication of when the metal material of the carrier 218 is collected by the detection device 258.

As the seal/sealing system is not designed to operate in the state/condition shown in FIG. 2A (e.g., the seal is not designed to operate with the nose 226 of FIG. 2 being (substantially) completely worn), when the detection device 258 indicates the presence of collected material of the carrier 218, the engine might only be allowed to operate for a very short time duration (e.g., a few hours) before the sealing member 224 needs to be replaced. This unscheduled/unexpected, sealing member 224 replacement activity represents a significant cost in terms of the removal of the engine from service.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system comprising: a rotatable seal runner, a stationary sealing member that includes a base and a nose that extends from the base in an axial direction and interfaces with the seal runner, a carrier that supports the sealing member, and a tab coupled to the carrier, where the tab extends from the carrier in the axial direction towards the seal runner. In some embodiments, when a portion of the nose is worn the tab contacts the seal runner. In some embodiments, the portion of the nose is less than an entirety of the nose. In some embodiments, the portion corresponds to between 80% and 90% of an entirety of an axial length of the nose. In some embodiments, the system further comprises a sensor that detects and indicates when a portion of the tab is liberated from a remainder of the tab in an amount that is greater than a threshold. In some embodiments, the sensor detects when the portion of the tab is liberated from the remainder of the tab based on a material of the tab. In some embodiments, the material of the tab includes at least one of iron or nickel. In some embodiments, the tab includes a first material and the carrier includes a second material. In some embodiments, the first material is different from the second material. In some embodiments, the tab is an integral extension of the carrier. In some embodiments, the tab is a separate member from the carrier. In some embodiments, the tab is attached to the carrier via one or more of a weld, a braze, or a mechanical fastener. In some embodiments, the sealing member includes a carbon segment. In some embodiments, the system further comprises a second rotatable seal runner, a stationary second sealing member that includes a second base and a second nose that extends from the second base in the axial direction and interfaces with the second seal runner, a second carrier that supports the second sealing member, and a second tab coupled to the second carrier, where the second tab extends from the second carrier in the axial direction towards the second seal runner. In some embodiments, the system further comprises a sensor that detects and indicates when a portion of the tab is liberated from a remainder of the tab in an amount that is greater than a threshold. In some embodiments, the sensor detects and indicates when a second portion of the second tab is liberated from a remainder of the second tab in an amount that is greater than a second threshold. In some embodiments, the tab includes a first material and the second tab includes a second material that is different from the first material. In some embodiments, the sensor provides an identification of the sealing member when the sensor detects the first material is present in the amount greater than the threshold, and the sensor provides an identification of the second sealing member when the sensor detects the second material is present in the amount that is greater than the second threshold.

BRIEF DESCRIPTION OF THE DRAWINGS

The present disclosure is illustrated by way of example and not limited in the accompanying figures in which like reference numerals indicate similar elements. The figures are not necessarily drawn to scale unless explicitly indicated otherwise.

DETAILED DESCRIPTION

Figure 1:
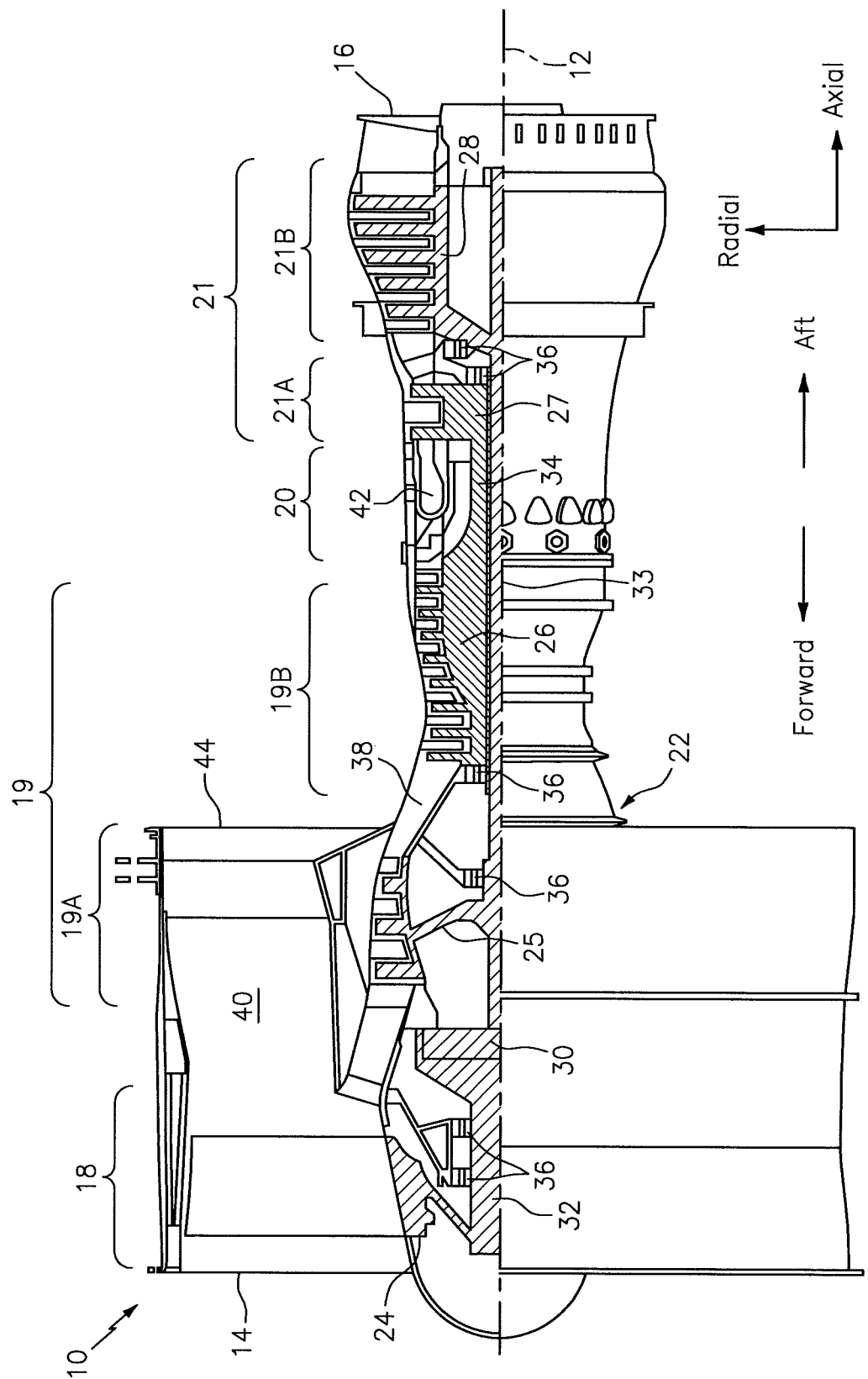
FIG. 1 is a side cutaway illustration of a geared turbine engine.
Figure 2:
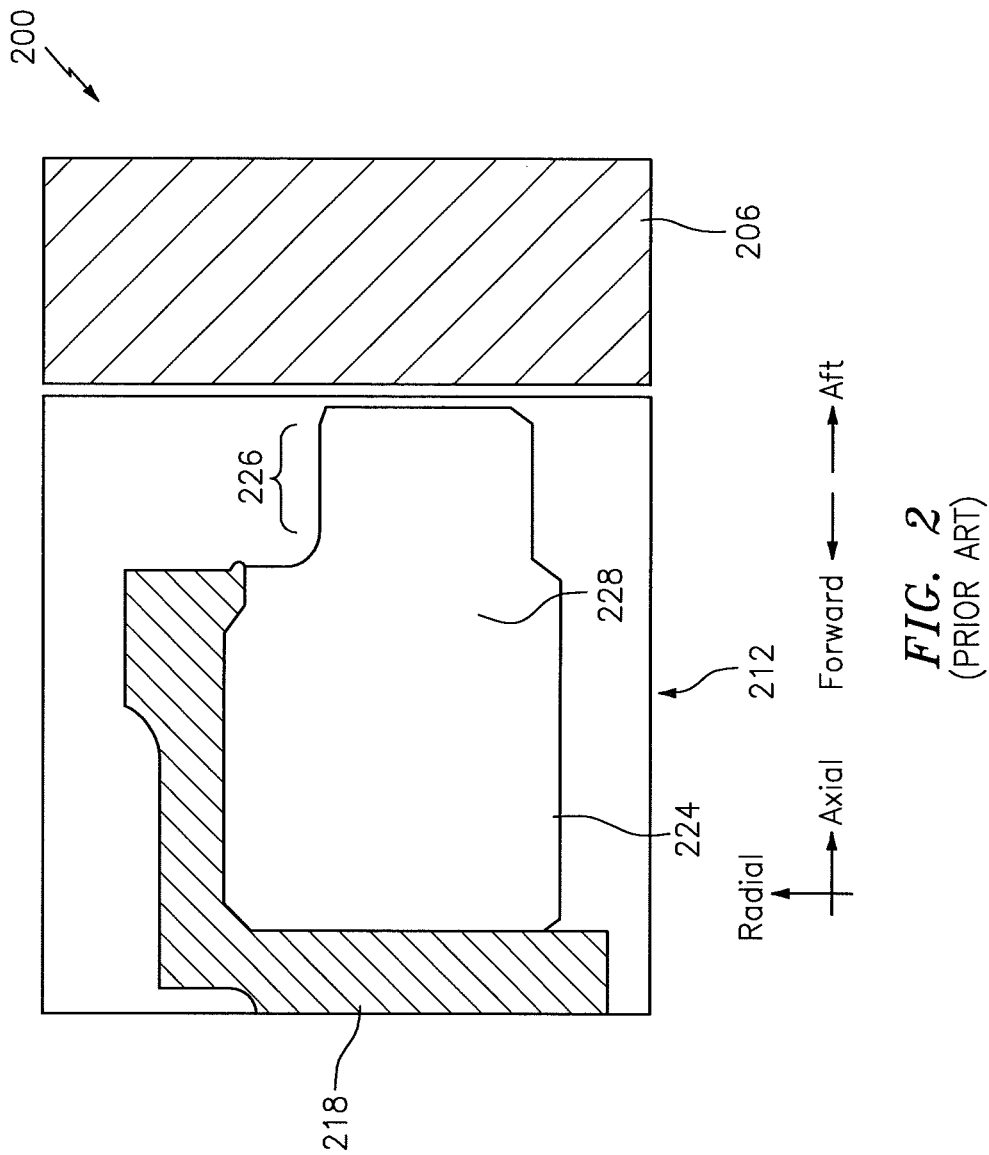
FIG. 2 illustrates a prior art sealing system that interfaces rotating structure and static structure.
Figure 2A:
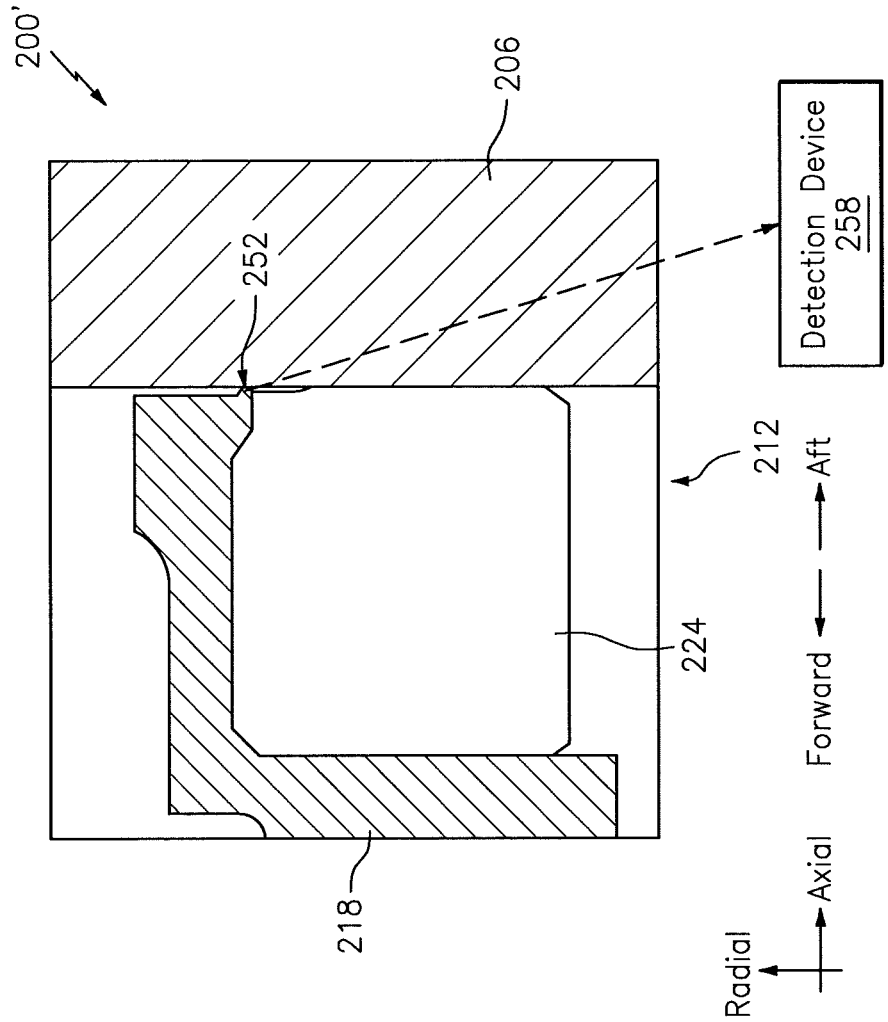
FIG. 2A illustrates the sealing system of FIG. 2 in a condition/state where a nose of a sealing member is substantially completely worn.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for detecting when a sealing member has worn in an amount greater than a threshold. In some embodiments, a carrier of the sealing member may include a tab that may project towards a rotating structure. At least a portion of the tab, which may serve as a sacrificial wear member, may be collected and detected by a detection device. This collected/detected portion may serve as an indication of the wear experienced by the sealing member.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for a geared turbine engine 10. Aspects of the disclosure may be applied in connection with other environments, including additional configurations for engines. Aspects of the disclosure may be applied in the context of a non-geared engine.

Figure 3:
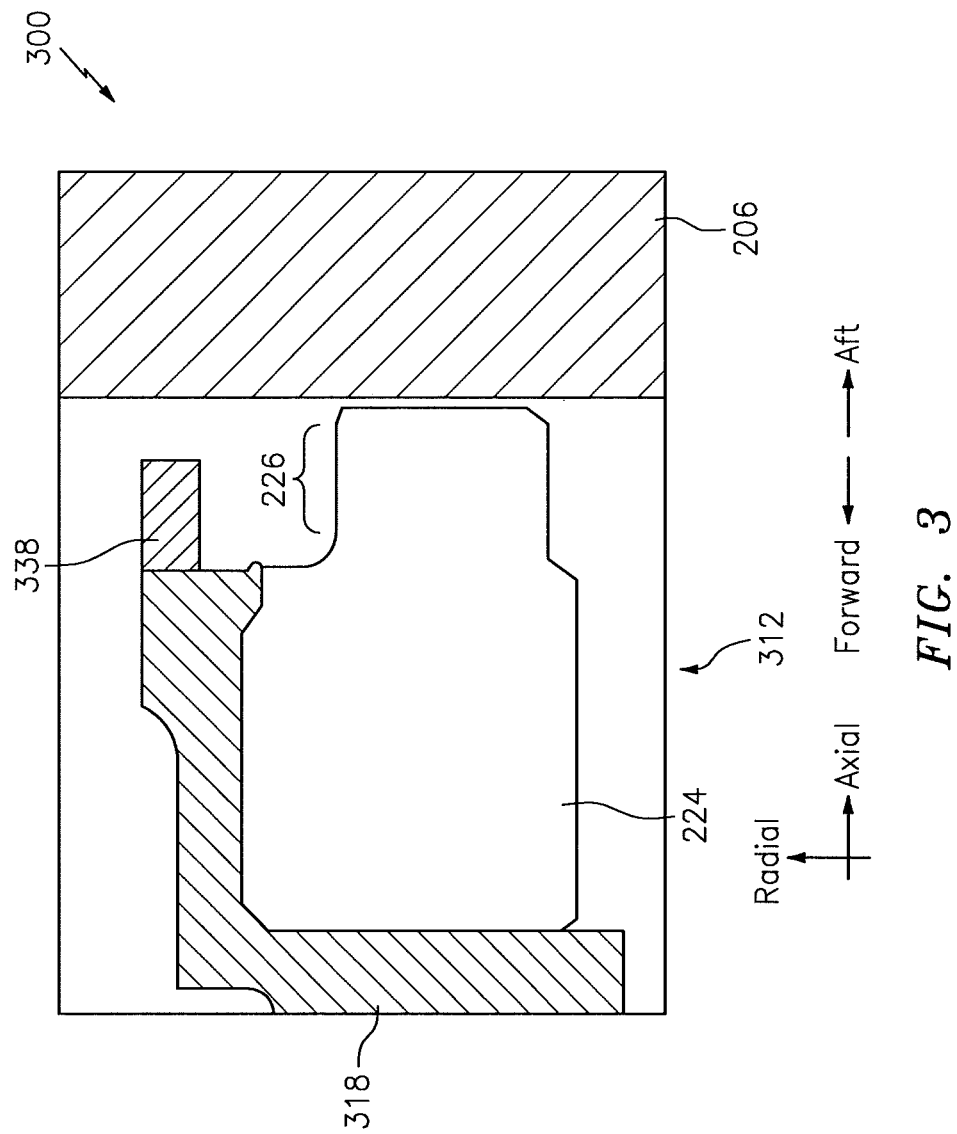
FIG. 3 illustrates a sealing system that interfaces rotating structure and static structure in accordance with aspects of this disclosure.

Referring now to FIG. 3, a system 300 is shown. The system 300 may interface rotating structure 206 (e.g., a rotatable seal runner) and static structure 312 in forming a seal. The system 300 may be used as part of an engine, such as for example the engine 10 of FIG. 1.

The static structure 312 may include a sealing member 224 (e.g., a carbon segment) with a nose 226. The sealing member 224 may be supported by a carrier 318. The carrier 318 may include/be made of one or more materials. For example, the carrier 318 may include iron or nickel in some embodiments.

The carrier 318 may be coupled to a tab 338. The tab 338 may project from the carrier 318 in a direction towards the rotating structure 206. As shown in FIG. 3, the tab 338 may project from the carrier 318 in substantially the same direction (illustratively, axially aft) as the projection of the nose 226 (from the body of the sealing member 224) towards the rotating structure 206. At least initially, the tab 338 may not contact the rotating structure 206.

In some embodiments, the tab 338 may be an integral extension of the carrier 318. In such embodiments, the carrier 318 may be manufactured (e.g., machined, cast, etc.) to include the tab 338.

In some embodiments, the tab 338 may be a separate member/element from the carrier 318 that may be attached to the carrier 318. In such embodiments, the tab 338 may be attached to the carrier, for example, via one or more of welding, brazing, a mechanical fastener (e.g., a rivet), etc.

During the operation of the engine on which the sealing system 300 is installed, the nose 226 shown in FIG. 3 may wear. For example, and referring to FIG. 3A, a nose 226' is shown. The nose 226' corresponds to the nose 226 following a partial wear of the nose 226. The (axial) length of the nose

226' may be less than the (axial) length of the nose 226, with the difference in length being attributable to the wear that is incurred by the nose 226.

Figure 3A:
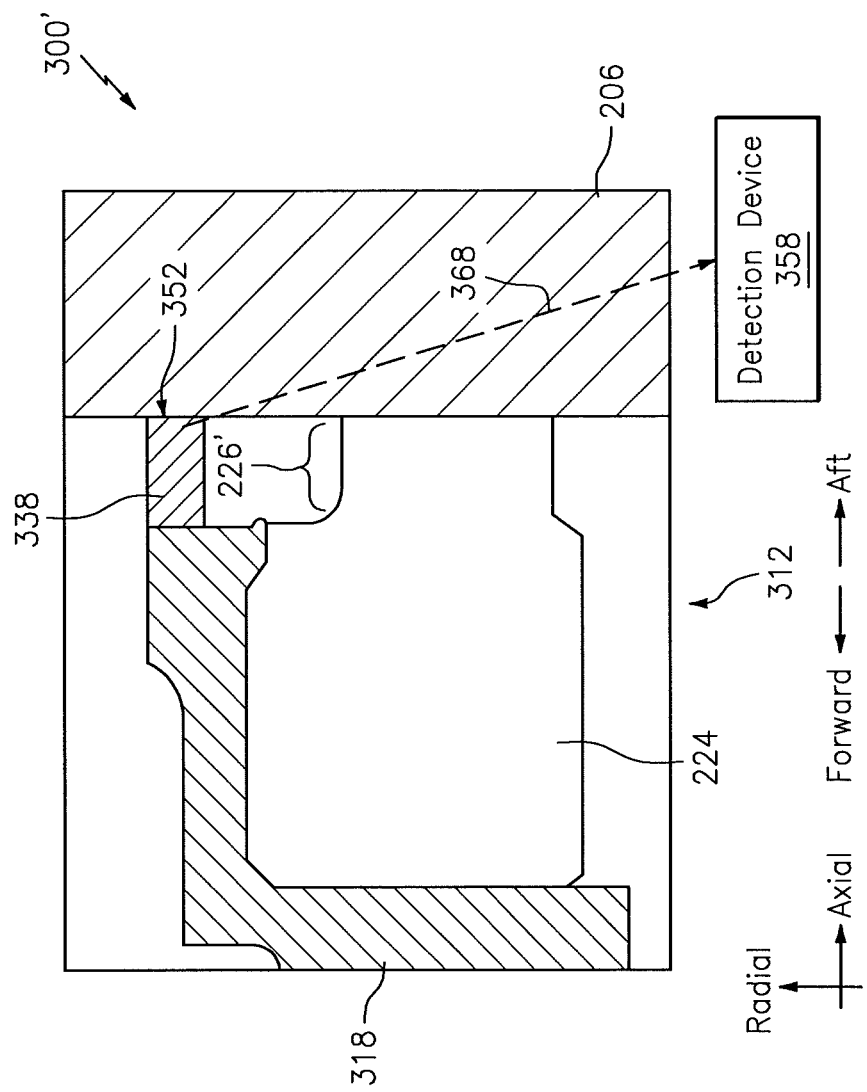
FIG. 3A illustrates the sealing system of FIG. 3 in a condition/state where a nose of a sealing member is fractionally worn.

Once the nose 226 has worn to the point shown in FIG. 3A, the rotating structure 206 may share an interface 352 with the (axially aft-most edge of the) tab 338. For example, the rotating structure 206 may contact the tab 338. Further operation of the engine (beyond the state/condition shown in FIG. 3A) may cause the tab 338 to wear. For example, further operation of the engine may cause, e.g., chips of the tab 338 to be generated at the interface 352. These chips/portions (represented by arrow 368) may be liberated from the tab 338. A sensor/detection device 358 may be configured to detect the presence of the worn material/chips 368 of the tab 338 (potentially in an amount greater than a threshold, where the threshold may be selected to avoid nuisance indications). The details of sensor/detection devices 358 of a type that may be used would be known to one of skill in the art; as such, a description of the same is omitted herein for the sake of brevity.

In accordance with the above, the tab 338 may serve as a sacrificial wear member by providing an indication that the sealing member 224 (e.g., the nose 226) has incurred wear in an amount that is greater than a threshold. For example, in some embodiments the tab 338 may be sized/dimensioned to provide an indication that the nose 226 is approximately 80%-90% worn (e.g., that the nose 226' is 10%-20% the size/dimension of the nose 226). The wear may be expressed in accordance with a dimension (e.g., length), a mass, etc. Knowing that the nose 226 is worn by the threshold amount may provide an early-warning indication that a maintenance activity should be (re-)scheduled, potentially to an earlier date/time than is customary. The indication provided by the detection device 358 may be used to schedule and prioritize when the engine will be taken out of service for maintenance based on the wear incurred by the sealing member 224.

The particular size/dimension of the tab 338 may be based on one or more parameters, such as for example a size (e.g., a diameter) of the seal, a detection resolution/capability of the detection device 358, etc. In some embodiments, the tab 338 may be segmented; the segments may be installed at various discrete locations of the carrier 318 around the circumference of the engine centerline.

In some embodiments, the tab 338 may be formed from the same material as the carrier 318. In some embodiments, the tab 338 may be formed from a different material than the carrier 318. Using different materials for the tab 338 and the carrier 318 may provide the detection device 358 with an ability to distinguish between the tab 338 and the carrier 318.

Figure 4:
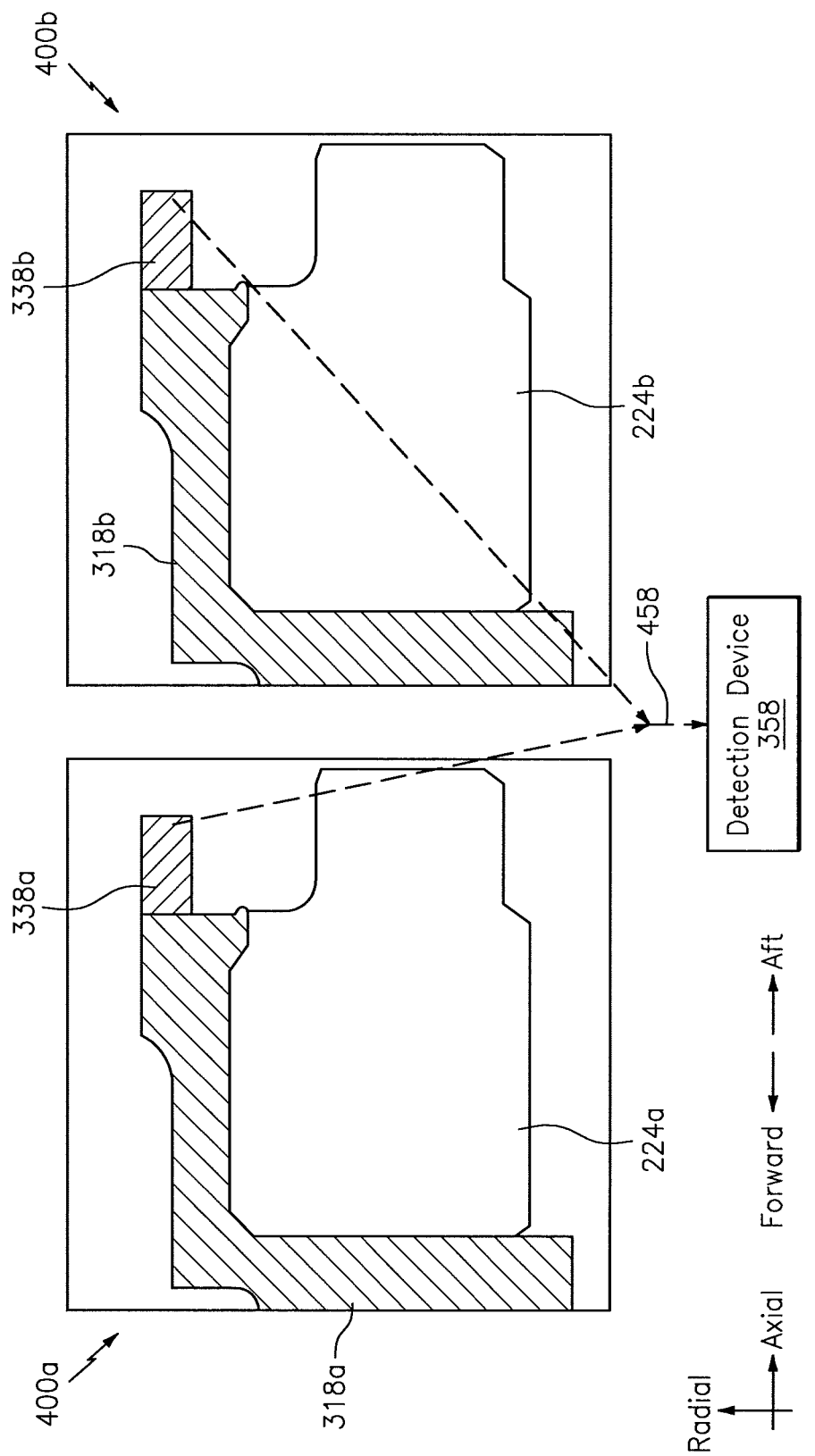
FIG. 4 illustrates two instances of a sealing system with sacrificial material from a plurality of tabs being provided to a common detection device.

At least a portion of the sealing system 300 may be duplicated a number of times on an engine. For example, the sealing provided by the system 300 may be replicated as part of a larger oil system of the engine. However, a common detection device 358 may be used. For example, and referring to FIG. 4, a first instance 400*a* (with first sealing member 224*a*, first carrier 318*a*, and first tab 338*a*) and a second instance 400*b* (with second sealing member 224*b*, second carrier 318*b*, and second tab 338*b*) that each incorporate portions of the system 300 are shown. Any rotating structure that may be included is omitted from FIG. 4 for the sake of ease in illustration.

Any sacrificial/worn portions of the tabs 338*a* and 338*b* may merge/collect with one another in a common return line/channel 458 before being provided to the detection device 358. In this respect, the first tab 338*a* may be made of a first material (e.g., iron) and the second tab 338*b* may be made of a second material (e.g., nickel) that is different from the first material. By using different materials for the tabs 338*a* and 338*b*, the detection device 358 may distinguish whether material collected by the detection device 358 is sourced from the first tab 338*a* or the second tab 338*b*. In this way, the detection device 358 may provide an indication that identifies which of the two sealing members 224*a* and 224*b* is worn beyond a threshold.

Figure 5:
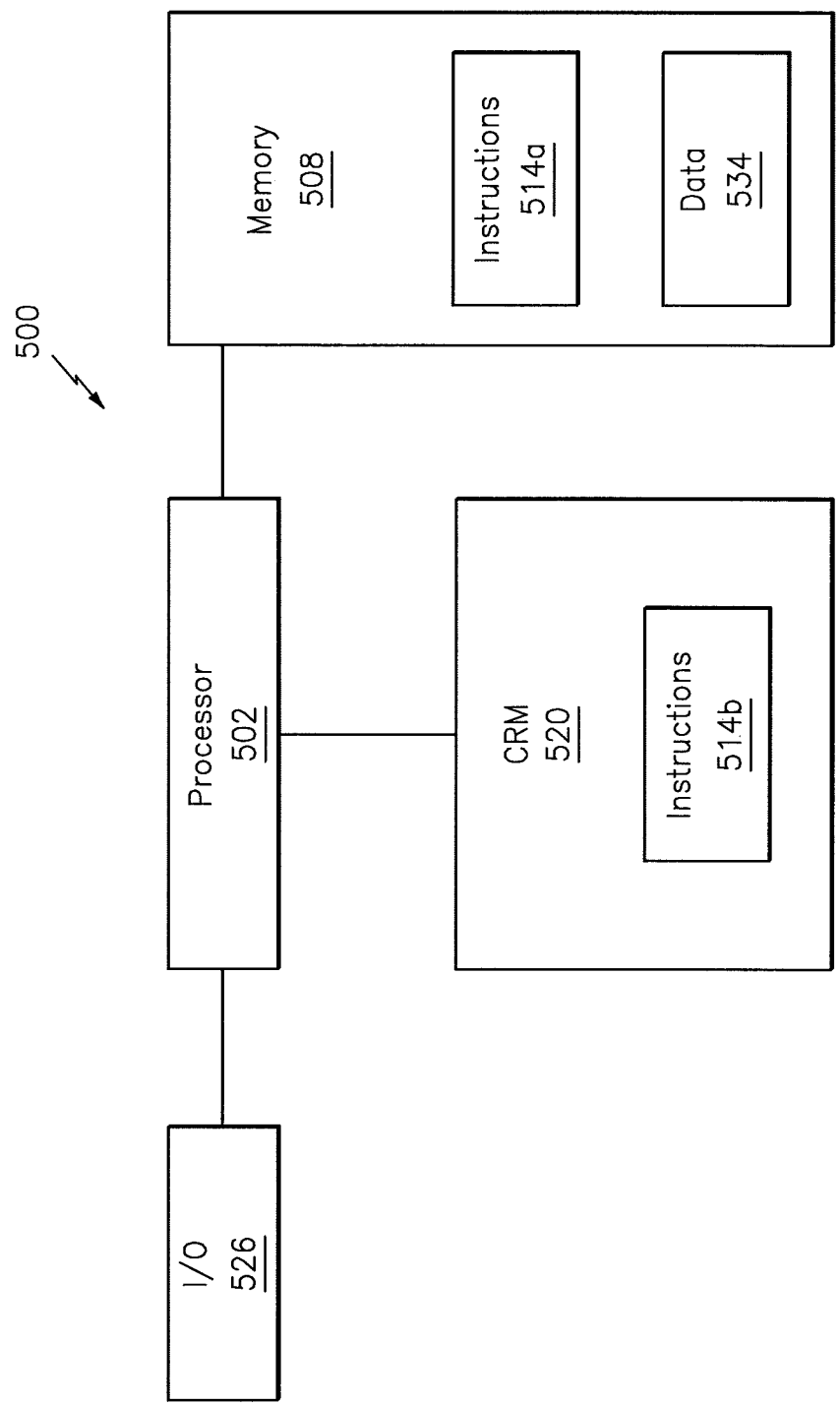
FIG. 5 illustrates a computing system in accordance with aspects of this disclosure.

Turning to FIG. 5, a computing system 500 that may be used in some embodiments is shown. The system 500 may be incorporated as part of another system, apparatus, component, etc. For example, aspects of the system 500 may be included as part of one or more of the systems 300/300' or instances 400*a* and 400*b*. Aspects of the system 500 may be included as part of the detection device 358 (see, e.g., FIGS. 3, 3A, and 4)

The system 500 may include a processor 502 and a memory 508. The memory 508 may store instructions (e.g., instructions 514*a*) that, when executed by the processor 502, may cause the system 500 to perform one or more methodological acts, such as one or more of the acts described herein. At least a portion of the instructions (e.g., instructions 514*b*) may be stored on a computer-readable medium (CRM) 520, such as for example a non-transitory CRM. The instructions 514*b* of the CRM 520 may be used as an alternative to, or in addition to, the use of the instructions 514*a* of the memory 508. One or both of the memory 508 and the CRM 520, taken individually or collectively, may be referred to as a storage device. Much like the CRM 520, the storage device may be non-transitory in nature.

In some embodiments, the system 500 may include one or more input/output (I/O) devices 526. The I/O devices 526 may provide an interface between the system 500 and one or more other components or devices. The I/O devices 526 may include one or more of a graphical user interface (GUI), a display screen, a touchscreen, a keyboard, a mouse, a joystick, a pushbutton, a microphone, a speaker, a transceiver, a sensor (e.g., a chip collector/detector), etc. The I/O devices 526 may be used to output data in one or more formats (e.g., a visual or audio rendering).

The memory 508 may store data 534. The data 534 may include an identification of a material of a component (e.g., a material of a sealing member, a carrier, a tab, etc.) and/or a mapping of a material to an instance of the component. In some embodiments, the data 534 may be remotely located from, e.g., the processor 502 and may be accessible via one or more networks, communication channels, etc.

The system 500 is illustrative. One skilled in the art will appreciate, based on a review of this disclosure, that system 500 may be implemented using hardware, software, firmware, or any combination thereof.

Some of the examples described herein relate to gas turbine applications. Aspects of the disclosure (e.g., wear tabs) may be used with mechanical systems that include rotating seals. Some embodiments may include a periodic or active monitoring of debris in a lubrication system.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A system comprising:
   a rotatable seal runner;
   a stationary sealing member that includes a base and a nose that extends from the base in an axial direction and interfaces with the seal runner;
   a carrier that supports the sealing member;
   a tab coupled to the carrier; and
   a sensor configured to detect and indicate when a portion of the tab is liberated from a remainder of the tab in an amount that is greater than a first threshold and when a portion of the carrier is liberated from a remainder of the carrier in an amount that is greater than a second threshold,
   wherein the tab extends from the carrier in the axial direction towards the seal runner,
   wherein the tab includes a first material and the carrier includes a second material different than the first material, and
   wherein the sensor is configured to distinguish between liberation of the portion of the tab from the remainder of the tab and liberation of the portion of the carrier from the remainder of the carrier based on detection of the first material or the second material in an amount that is greater than the first threshold or the second threshold, respectively.

2. The system of claim 1, wherein when a portion of the nose is worn the tab contacts the seal runner.

3. The system of claim 2, wherein the portion of the nose is less than an entirety of the nose.

4. The system of claim 2, wherein the portion corresponds to between 80% and 90% of an initial axial length of the nose.

5. The system of claim 1, wherein the first material of the tab includes at least one of iron and nickel.

6. The system of claim 1, wherein the tab is an integral extension of the carrier.

7. The system of claim 1, wherein the tab is a separate member from the carrier.

8. The system of claim 7, wherein the tab is attached to the carrier via one or more of a weld, a braze, or a mechanical fastener.

9. The system of claim 1, wherein the sealing member includes a carbon segment.

10. The system of claim 1, further comprising:
    a second rotatable seal runner;
    a stationary second sealing member that includes a second base and a second nose that extends from the second base in the axial direction and interfaces with the second seal runner;
    a second carrier that supports the second sealing member; and
    a second tab coupled to the second carrier,
    wherein the second tab extends from the second carrier in the axial direction towards the second seal runner.

11. The system of claim 10, wherein the sensor is configured to detect and indicate when a second portion of the second tab is liberated from a remainder of the second tab in an amount that is greater than a third threshold.

12. The system of claim 11, wherein the second tab includes a third material that is different from the first material.

13. The system of claim 12, wherein the sensor provides an identification of the sealing member when the sensor detects the first material is present in the amount greater than the threshold, and wherein the sensor provides an identification of the second sealing member when the sensor detects the third material is present in the amount that is greater than the third threshold.

* * * * *